(12) United States Patent
Benneweis

(10) Patent No.: US 6,877,675 B2
(45) Date of Patent: *Apr. 12, 2005

(54) PRECISION FARMING SYSTEM FOR APPLYING PRODUCT TO A FIELD

(75) Inventor: Robert K. Benneweis, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/706,540

(22) Filed: Nov. 12, 2003

(65) Prior Publication Data

US 2004/0128045 A1 Jul. 1, 2004

Related U.S. Application Data

(62) Division of application No. 10/104,091, filed on Mar. 22, 2002, now Pat. No. 6,678,580, which is a division of application No. 09/638,083, filed on Aug. 14, 2000, now Pat. No. 6,522,948.

(51) Int. Cl.$^7$ ................................................ B05B 7/14
(52) U.S. Cl. ........................... 239/63; 239/64; 700/237
(58) Field of Search .......................... 239/63, 64, 398, 239/422, 578; 700/237, 244, 240, 241

(56) References Cited

U.S. PATENT DOCUMENTS

| | | | |
|---|---|---|---|
| 5,260,875 A | 11/1993 | Tofte et al. | |
| 5,653,389 A | 8/1997 | Henderson et al. | |
| 5,684,476 A | 11/1997 | Anderson | |
| 5,689,418 A | 11/1997 | Monson | |
| 5,837,997 A | 11/1998 | Beck et al. | |
| 5,913,915 A | 6/1999 | McQuinn | |
| 5,919,242 A | 7/1999 | Greatline et al. | |
| 5,924,371 A | 7/1999 | Flamme et al. | |
| 5,956,255 A | 9/1999 | Flamme | |
| 5,967,066 A | 10/1999 | Giles et al. | |
| 6,024,305 A | 2/2000 | McFarlane | |
| 6,061,618 A | 5/2000 | Hale et al. | |
| 6,070,539 A | 6/2000 | Flamme et al. | |
| 6,089,743 A | 7/2000 | McQuinn | |
| 6,092,745 A | 7/2000 | Seymour et al. | |
| 6,115,481 A | 9/2000 | Wiens | |
| 6,128,574 A | 10/2000 | Diekhans | |
| 6,178,253 B1 | 1/2001 | Hendrickson et al. | |
| 6,193,166 B1 | 2/2001 | Miller et al. | |
| 6,195,604 B1 | 2/2001 | Moore et al. | |
| 6,199,000 B1 | 3/2001 | Keller et al. | |
| 6,230,091 B1 | 5/2001 | McQuinn | |
| 6,246,932 B1 | 6/2001 | Kageyama et al. | |
| 6,522,948 B1 | 2/2003 | Benneweis | |
| 6,678,580 B2 * | 1/2004 | Benneweis | 700/237 |

FOREIGN PATENT DOCUMENTS

WO   WO 99/18482 A1   4/1999

* cited by examiner

Primary Examiner—David A. Scherbel
Assistant Examiner—Thach H. Bui
(74) Attorney, Agent, or Firm—Rebecca Henkel; Brant T. Maurer

(57) ABSTRACT

A control system is disclosed for an agricultural implement, such as an agricultural sprayer, used to dispense a product to the ground wherein the dispensing units for the product are provided with control valves that can reduce the flow rate of product through selected dispensing units to zero. By controlling the rate of flow through the dispensing units, overlap of the application of the product to the ground can be substantially eliminated. In alternative embodiments of the invention, the control mechanism can receive data from a remote source, such as a central controller or another implement operating in the field, to define where the product needs to be applied to the ground. The application of the product can also be controlled through or in conjunction with a prescription map. Preferably, each dispensing unit is provided with a control valve operably associated with the control system so that each dispensing unit can be independently controlled to provide a variable flow rate of the product to the ground.

5 Claims, 8 Drawing Sheets

PRECISION FARMING SYSTEM FOR APPLYING PRODUCT TO A FIELD

CROSS REFERENCE TO RELATED APPLICATIONS

The present divisional application claims priority under 35 U.S.C. §120 from U.S. patent application Ser. No. 10/104,091 by ROBERT K. BENNEWEIS entitled "CONTROL SYSTEM FOR AN AGRICULTURAL IMPLEMENT", which was filed on Mar. 22, 2002 now U.S. Pat. No. 6,678,580, and which is a divisional application of U.S. Ser. No. 09/638,083, filed Aug. 14, 2000, now U.S. Pat. No. 6,522,948 by ROBERT K. BENNEWEIS entitled "AGRICULTURAL PRODUCT APPLICATION TRACKING AND CONTROL", which issued on Feb. 18, 2003. The full disclosure of U.S. patent application Ser. No. 10/104,091 and U.S. Pat. No. 6,522,948 are hereby fully incorporated by reference.

FIELD OF THE INVENTION

This invention is related to precision farming in which agricultural implements apply products to a field in a location specific manner.

BACKGROUND OF THE INVENTION

The benefits of site specific product application control are well known in the industry. Some product application variables that may be controlled according to location within a field may include product type and product rate. The product rate may be related to an amount in weight per unit area, or to a spacing between units such as individual seeds. The product type and rate prescribed for an area may be dependent on factors such as soil type, historic yield data, and historic or expected precipitation. It has been found that application of agricultural products in such a prescribed manner can increase yields and/or reduce farming input costs to improve overall profits. Implements that use this type of technology include seeding, planting, fertilizing, and spraying equipment. On other equipment, such as harvest equipment, there may be data collection systems to collect data to be used with a prescription farming system. The prescription farming system generally includes some device for tracking location within a field, such as GPS, and a mechanism to control the product rate, type, or other parameters to be controlled according to a prescription which is commonly recorded on a prescription map corresponding to the area of the field.

An implement configured for prescription farming typically has a control system in which the prescription map is stored, or capable of reading prescription map data stored on a device such as a disk or PCcard. The map can be displayed for the operator to view in the operator's cab. Commonly color coding may be used on the map to illustrate differences in product rate or type corresponding to different areas of the field.

Critical farming operations such as seeding or planting must typically be performed within a short window of time in order for the crop to mature within the growing season and for best yield amount and quality. Since speed and efficiency are important in farming operations, there may be more than one implement operating in a field at one time. A problem arises when each such implement is using independent precision farming systems, whereby each implement system operates without the knowledge of the other implement's operation. Two or more of the implements may apply product to the same location, or the implements may altogether miss a location resulting in zero product being applied to that location, each of which could adversely affect yield.

SUMMARY OF THE INVENTION

The limitations and disadvantages of the prior art are overcome by a control system for controlling the dispensing of agricultural crop products to a field.

It is an object of the present invention to provide a control system for the application of agricultural products, which aids in preventing the missed application of products or the duplicate application of products to locations within a field.

It is a feature of this invention that the operator of a crop product applicator implement can be guided to appropriate locations for the dispensing of crop products, depending on information about whether there were prior applications of a crop product at those locations.

It is another object of this invention to provide a control system for controlling or guiding the application of one or more agricultural products by a product applicator implement dependent on information about one or more products that have previously been applied.

It is an advantage of this invention that the agricultural products being applied to the field may be the same as or may be different than those being presently applied by other implements at a rate that is dependent on the information about the previously applied products.

It is another feature of this invention that the product application information may include for each previously applied product, one or more of: location previously applied, rate previously applied, type previously applied, date previously applied, or other such information as may be useful in determining optimum rates for application of a product presently being applied.

It is still another object of this invention to provide a control system for controlling or guiding the application of agricultural products by a product applicator implement which aids in preventing the missed application of products or the duplicate application of products to locations within a field.

It is another advantage of this invention that the product application information can be related to the locations where product was previously applied by this or another implement.

It is yet another object of this invention to provide a control system to coordinate the operation of two or more crop product applicators operating within a field to prevent the missed application of products or the duplicate application of products to locations within a field.

It is still another feature of this invention that the prior application of products can be displayed for viewing by the operator so that the operator can make decisions and provide appropriate control actions for the present application of a product within a field.

It is yet another object of this invention to provide a control system that can automatically calculate and provide control signals to the control system on a product applicator implement for controlling the dispensing of a product within a field.

It is still another advantage of this invention that a display monitor may also be provided with such a system for the operator to observe and monitor the operation of the control system, and to provide the operator information for the guidance of the implement to appropriate locations within the field where product application is required.

It is yet another feature of this invention that the control system can control a plurality of dispense controls independently to apply products at a first dispensing rate from a first dispensing unit or group of units, and at a second dispensing rate from a second dispensing unit or group of units.

It is a further advantage of this invention that the independent control of a plurality of dispense controls can prevent duplicate application of product to locations where the implement may be overlapping locations where product has previously not been applied and has been applied.

It is a further object of this invention to provide a central control system for communicating with one or more control systems of product applicator implements operating within a field so that the operation of each of the implements within the filed is coordinated to prevent the missed application of products or the duplicate application of products to locations within a field.

It is a further feature of this invention that each product applicator control system may be independently calculating product dispensing rates for its location based on information being communicated with the central control system, or the central control system may be calculating and providing dispensing rate information to each product applicator control system.

It is yet a further object of this invention to provide a control system for each of two or more applicator implements operating within a field, which includes a communication transceiver for communicating information by which they are coordinated so that the two or more implements may communicate such information with each other or with a central control system as described above.

These and other objects, features and advantages can be accomplished by providing a control system for an agricultural implement, such as an agricultural sprayer, used to dispense a product to the ground wherein the dispensing units for the product are provided with control valves that can reduce the flow rate of product through selected dispensing units to zero. By controlling the rate of flow through the dispensing units, overlap of the application of the product to the ground can be substantially eliminated. In alternative embodiments of the invention, the control mechanism can receive data from a remote source, such as a central controller or another implement operating in the field, to define where the product needs to be applied to the ground. The application of the product can also be controlled through or in conjunction with a prescription map. Preferably, each dispensing unit is provided with a control valve operably associated with the control system so that each dispensing unit can be independently controlled to provide a variable flow rate of the product to the ground.

DETAILED DESCRIPTION OF THE PREFERRED EMBODIMENTS

Figure 1:
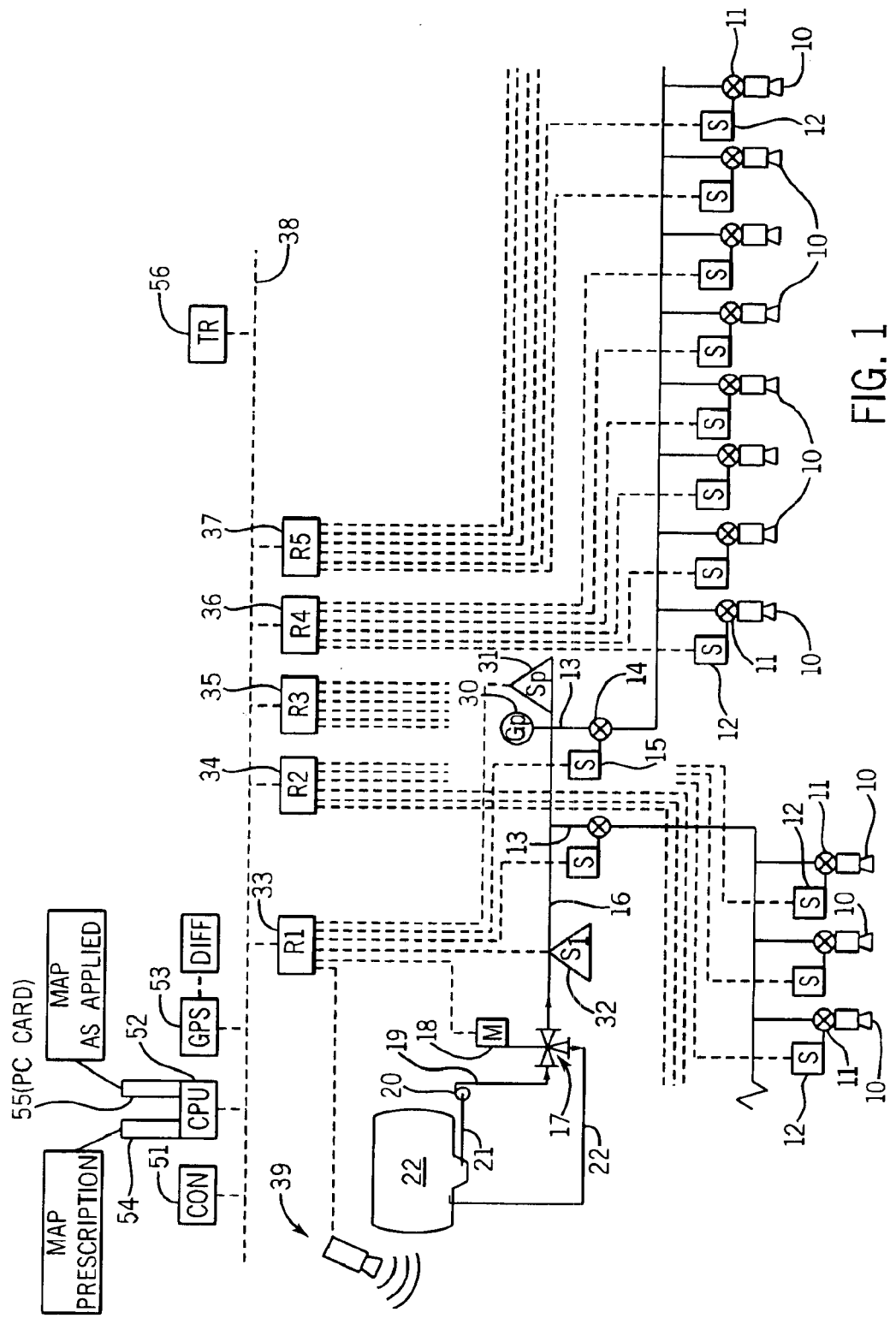
FIG. 1 is a schematic diagram illustrating a product application system with controls and an interfacing control system incorporating the principles of the instant invention.
Figure 4:
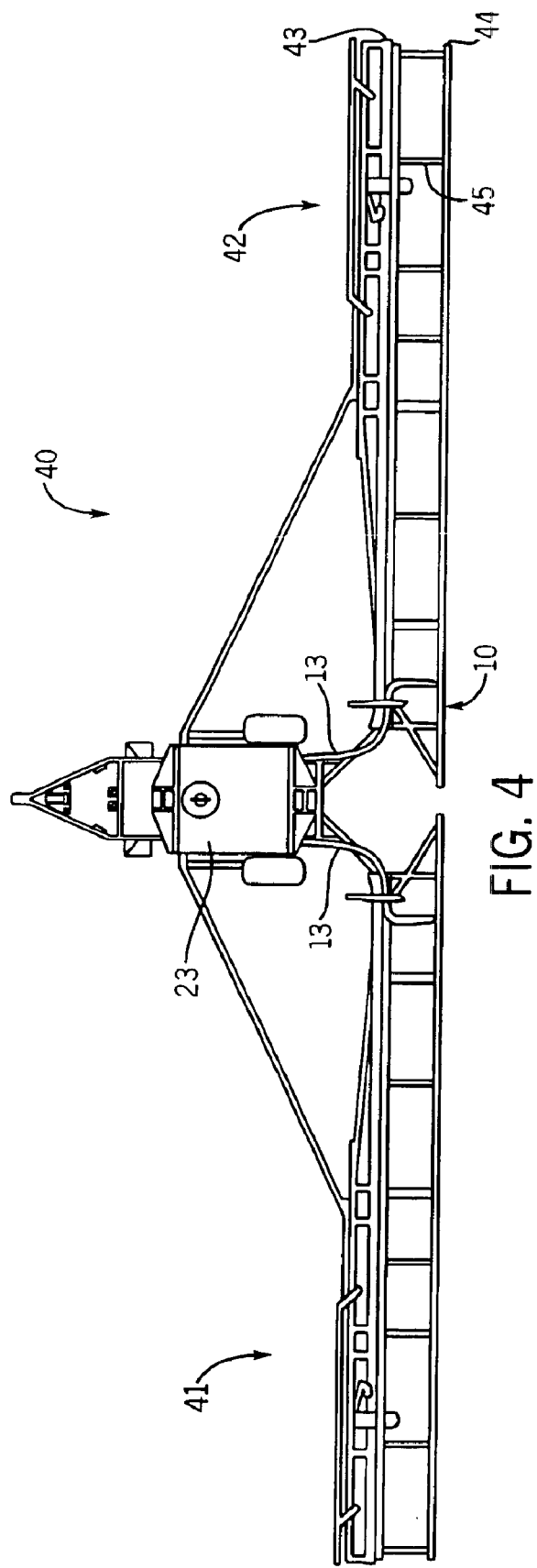
FIG. 4 is a top plan view of an agricultural sprayer incorporating the principles of the present invention.
Figure 5:
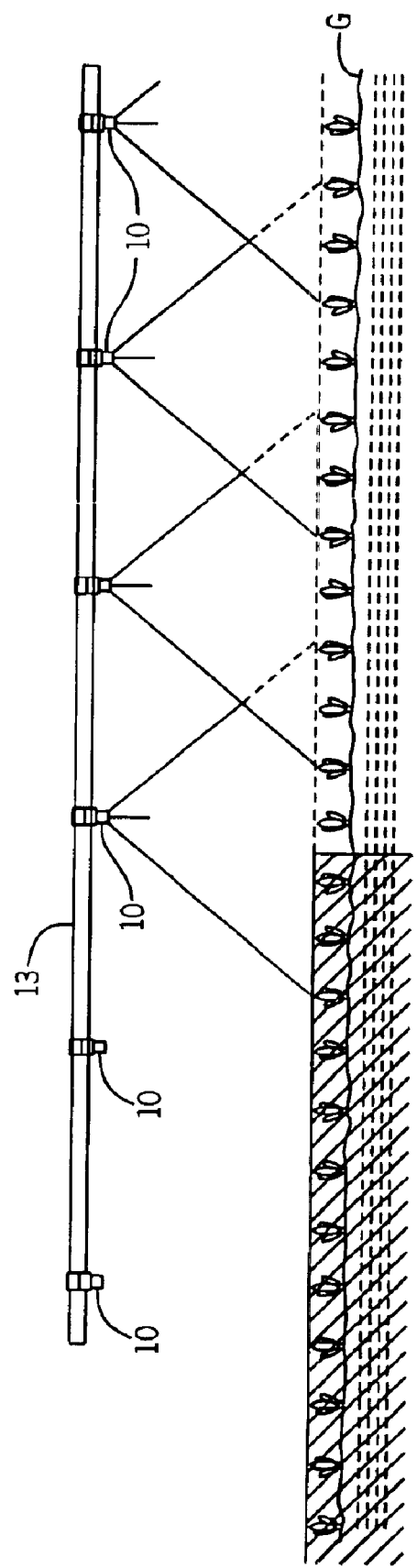
FIG. 5 is an enlarged partial elevational view of a spray boom of the sprayer shown in FIG. 4 to depict the booms.

Referring first to FIGS. 1, 4 and 5, an agricultural product applicator implement, depicted in the form of an agricultural sprayer, incorporating the principles of the instant invention can best be seen. Any left and right references are determined by standing behind the implement and facing forwardly toward the direction of travel. In the product application system shown in FIG. 1 the product to be applied to the field is dispensed from the sprayer heads 10 connected to a product distribution lines 13. A product flow control 11 is provided for each dispense unit 10 to control the product flow from the distribution line 13 to each dispense unit 10. Each product flow control 11 is controlled by a solenoid control 12.

The implement preferably includes 2 product distribution lines 13, each with sprayer heads 10, flow controls 11, and solenoid controls 12. The overall product flow to the distribution lines is controlled by a flow control valve 14 in each distribution line 13, and each flow control valve 14 is controlled by a solenoid control 15. Control valves 14 provide the ability to shut off operation of a corresponding distribution branch. Rates applied from individual sprayer heads 10 may also be controlled by corresponding control valves 11. This may simply be on/off control, or can be variable control in a manner known in the art, such as by cycling control valves 11 open and closed in pulses and controlling rates by varying the pulse width and/or frequency. The frequency control may be limited by the response limit of the valve. Frequency and pulse width may also be controlled to maintain a particular spray droplet size or spray pattern, while controlling rates, as is well known in the art.

The product distribution lines 13 are connected to a main distribution line 16 associated with a line pressure gage 30 and a line pressure sensor 31. Also in this main distribution line 16 located upstream of the connection to the distribution lines 13 is a line flow sensor 32. The main product distribution line 16 is connected to a 3-way flow control valve 17 controlled by a servo-actuator 18. Product flow is generated by a pump 20 and is carried in the output line 19 into the 3-way control valve 17. A bypass line 22 carries excess flow as controlled by the 3-way control valve 17 back to the product supply tank 23. The pump 20 draws product from the product supply tank 20 through the pump input line 21 for delivery through the output line 19.

In the particular embodiment shown in FIG. 1 the 3-way control valve 17 controls the product total dispense rate for product distributed to the sprayer heads 10. The flow rate is measured by the flow sensor 32. The distribution line pressure is also detected by pressure sensor 31. Having both these bits of information allows the control system 100 to detect and warn of potential errors in operation. Each sprayer head 10 dispenses product at a dispense rate proportional to the distribution line pressure. If the measured total flow is not equal to the total flow expected, then it is likely that one or more sprayer heads are worn, damaged, or plugged. The total flow rate however can be controlled by the 3-way control valve 18 with flow rate feedback from the sensor 32 so that even though nozzles may be worn, the product application rate is properly controlled. The system can continue to operated until a sudden change in pressure or flow indicates a problem or until the measure and expected flow rates are beyond a threshold of discrepancy.

A product application system as described above can be configured on an implement 40 such as that shown in FIG. 4. This implement includes left and right application booms 41 and 42 respectively. Each application boom may be configured with at least one product distribution line 13 with product sprayer heads 10 evenly spaced along the length of the boom 41, 42 so that in the field position shown in FIG. 4, they are spaced transverse to the direction of travel to apply product in a wide path. Each boom of this particular implement 40 includes a structural main boom 43 on which is mounted a applicator boom 44. The distribution line 13 forms the actual applicator boom supported pivotally on the main boom 43 by several arms 45. Alternatively, a dry boom may be used for structure in place of the distribution line 13 as the applicator boom 44, with the distribution line being supported along the applicator boom 44. The elevation of the product sprayer heads 10 relative to the field surface or crop top may be adjusted by pivotally adjusting the applicator boom 44.

FIG. 1 also illustrates other control components used in operating the precision farming control system of the present invention. Various remote controls 33–37 are used to communicate with the sensors and controllers to control product application according to the invention. Each remote control 33–37 is connected to a control communication bus 38, which allows various control components to communicate with each other. A first remote control 33 gets signals from sensors 31 and 32 and controls servos 15 and 18. The first remote control 33 sends signals to and gets signals from other components connected to the bus 38. These signals are sent and received with an identifier, which specifically indicates which remote they are sent from or are intended for. The message carried by the signal includes information about which sensor the signal is from or to which control the signal is for, and values certain parameters. The remotes 33–37 are shown with connections to sensors or controls in a combination up to six in total, but this total may more commonly be up to twenty four connections, depending on the electrical current required by each connection. A second remote 34 is connected to six dispense unit solenoid controls 12 and provides these controls with signals communicated from the bus and communicates status of these control 12 to the bus. Similarly other remotes 35, 36, and 37, control and communicate the status of solenoid controls 12.

Figure 6:
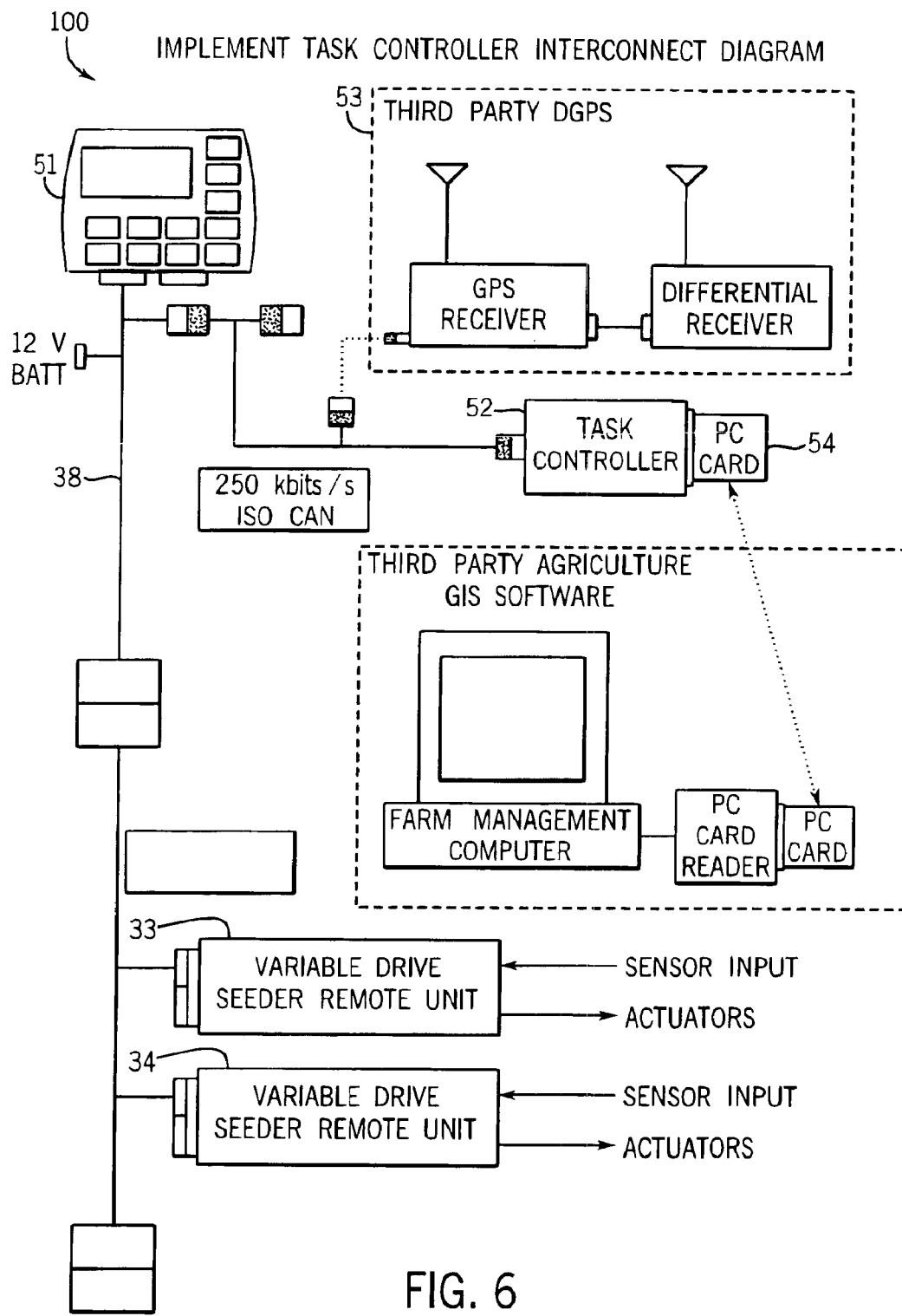
FIG. 6 is a schematic diagram of a control system depicting an embodiment of components that may be typically used for operating the precision farming control system of the present invention.

FIG. 6 illustrates a preferred embodiment of some control components in a control system 100 according to the invention. A console 51 is a component by which an operator can input and receive data about the operation of the control system. It is connected in communication with the bus 38. A task controller 52 and differential corrected global positioning system (DGPS) 53, are also connected to the control system bus 38. Alternate positioning systems may be used to perform the invention, however DPGS is currently the industry preferred positioning system. Control calculations may be performed by one or more of the components in the control system. In the preferred embodiments shown, the task controller 52 performs rate calculations and generates values for the control signals.

The preferred embodiment includes in the control system 100 the capability for prescription rate control. The desired application rate of each product to be applied can be produced using a GIS application software that produces a digital map of each product's desired application rates. Location specific field characteristics and prior yield data is typically used in producing this map. These digital maps are communicated to the task controller 52 on the seeding or spraying implement by means of a prescription PCcard 54. Other means of configuring the control system with prescription rate data are possible. Production and use of product application prescription maps is well known in the art.

For prescription rate control, the task controller 52 compares the present position of the implement 40, which is provided by the DGPS receiver 53, to the same position in the prescription map. The task controller 52 gets the application rate for each product to be applied to that location from the prescription map and then calculates a dispense rate value to apply to the total flow rate control valve 17, or for more precise control, to each solenoid control 12, based on the speed at which the implement 40 is moving, and the area covered by each dispense unit 10 that are controlled by that solenoid control 12, if more than one are controlled by a single valve. The task controller 52 then communicates the desired dispense rate to the appropriate flow control via the communication bus 38 and the implement's remote controls 33–37. The dispense rates are controlled depending on the application rate for the particular location as well as the speed at which the implement is moving to achieve the appropriate application rate.

The control system 100 may also include provision to compensate for physical offsets and delays inherent in the product application system. The GPS antenna may be located near the front of the implement 40, or on a pulling vehicle such as a tractor (not shown) used for pulling the implement 40. The sprayer heads 10 are typically arranged along and/or about a line on the implement 40 that is transverse to the direction of travel and that is to the rear of the GPS antenna relative to the direction of movement of the implement in operation. Thus as the implement is moving across the field there is a delay from the moment the GPS antenna reaches a location to the moment the transverse line of sprayer heads 10 reaches that location, depending on the speed at which the implement 40 is moving. Another possible delay to changing the dispense rates would relate to the difference in time for the product entering the distribution lines until the product reaches the sprayer heads 10. A liquid sprayer for example may be of the type that injects product into a water carrier at a location in the distribution lines, such as near where the flow sensor 32 is shown in FIG. 1. Thus, the product will not reach the dispense points until a certain time expires during which the product concentration or product type previously in the distribution lines has been dispensed.

For agricultural sprayers, the time for spray to travel from the sprayer head 10 to the target, e.g. the plant or the ground, is also a significant delay. The target may be at the ground surface or generally within the elevation of a crop canopy, and the sprayer heads 10 may be set about 18 inches above that. Sprayer heads are therefore controlled in advance of the target to compensate for the distance it travels along with the applicator implement before it reaches the target elevation. The compensation period depends on the speed at which the agricultural sprayer is moving and the distance above the target at which sprayer heads 10 are set.

Rates at which the product is dispensed may be controlled by a prescription rate control system, or may be set by the operator and adjusted during operation, or may be left fixed during operation. Whatever the case, the dispense rates may be further controlled by a system that calculates dispense rates as described above in accordance with the implement speed and set application rates so that the proper application rate is achieved if the implement speed varies as is well known in the art. For control of the dispense rates and for the delay compensation control described above, the implement controls also preferably include a speed sensor 39. Preferably, the sensor 39 is configured to sense true ground speed so that implement or pulling vehicle wheel slippage does not introduce error as can occur with known systems that sense wheel rotation. Preferably the ground speed sensor 39 is a radar type sensor and the first remote 33 communicates signals from this sensor 39 to the bus 38.

As the implement traverses the field, the task controller makes a record of where product has been applied. This record may also be in map format like that of the prescribed application rate data, and be stored on an as applied PCcard 55. The invention described below in more detail includes use of the data of prior product application to reduce or eliminate duplicate application.

Figure 3:
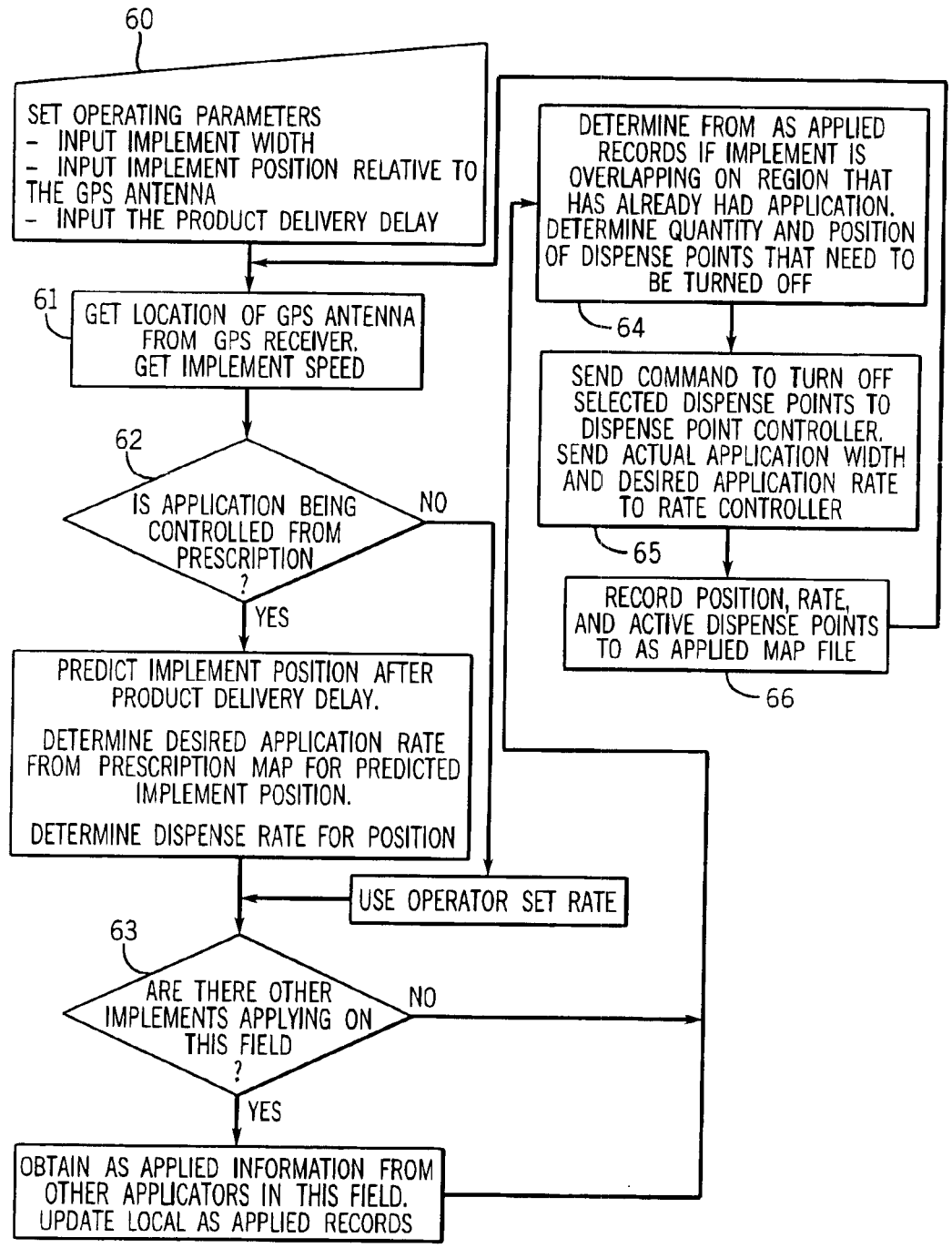
FIG. 3 is a logic flow diagram for a control algorithm by which a precision farming control system of the present invention may operate.

FIG. 3 illustrates the preferred embodiment of a control algorithm for controlling the operation of a control system according to the invention. At an initializing step 60, the operator sets various operating parameters for the operation of the control system which may include the following: implement width; implement position relative to DGPS antenna; delivery delay period; and default rates.

The task controller 52 or other component in the control system will have previously been initialized or become initialized at startup with information about the number of and the location of each of the sprayer heads 10 and to which control valves 11 and solenoids 12 they correspond to. It calculates the width of the area that each dispense unit 10 will cover in operation from the implement width and number of sprayer heads found or entered by the operator.

As the implement 40 traverses the field, the task controller 52, at step 61, establishes the location of the GPS antenna from the signal provided by the DGPS system. At the next step 62 of the operation, the control system 100 determines if the dispense rates of the system are to be controlled by a prescription application system and the dispense rate or rates are determined accordingly. Prescription application control, however, is also not essential to the operation of the invention but is preferred.

Step 63 effects coordination with other similar implements that may be working in the same field, as will be noted in greater detail below. At step 64, the control system determines from the as applied data (PCcard 55) if product had been previously applied to the locations for which dispense rates are currently being calculated.

The dispense rates can be set to a reduced rate or to zero at step 65 for those sprayer heads 10 that are so controlled. For the type of control as illustrated in FIG. 1, the dispense unit control valves 11 are positioned close to the sprayer heads 10 so that for controlling the prevention of duplicate application of product, there need not be any compensation for product distribution delay, but perhaps preferably compensation would be provided for positional differences between the GPS antenna and the location of the sprayer heads relative to the antenna. This product control system is also applicable for planters and airseeders. For other systems such as airseeders and other granular applicator implements that may have longer distribution lines between dispense unit control valves 12 and sprayer heads 10, the dispense rates can be predicted and set in advance to compensate for delays as noted above so the product will be dispensed from the sprayer heads 10 at rates which are appropriate for locations the sprayer heads 10 are at. Several sprayer heads 10 may be controlled from a single dispense unit control valve 12 or other metering or control mechanism.

At step 66, the actual application rate from the sprayer heads 10, or for less precisely controlled systems, from the total flow sensor 32, or other detection mechanism, can be determined and stored as "as applied data" corresponding to the location the sprayer heads are currently dispensing from, or alternately but less preferably, are expected to be dispensing from. This "as applied data" may be stored in any conventional manner and preferably on the as applied PCcard 55. This data may also have other useful applications for which the PCcard 55 conveniently stores the data.

Figure 2A:
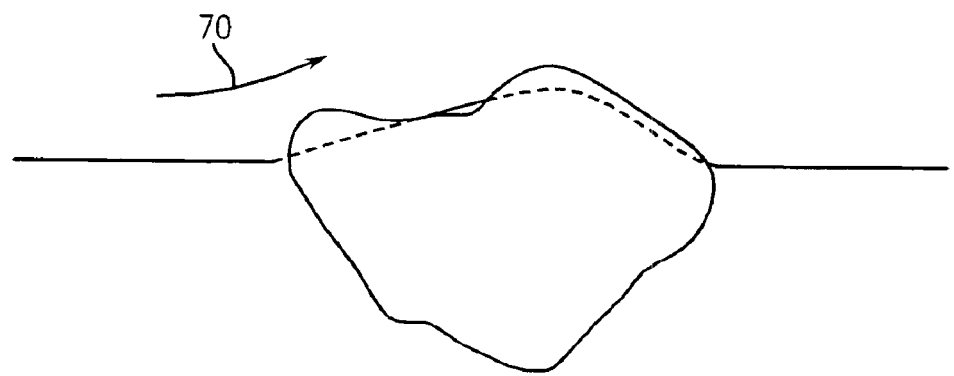
FIGS. 2a–c are diagrammatic illustrations of exemplary paths that can be taken by a product application system in a field in which the product application system overlaps areas where product has been applied on a preceding path.
Figure 2B:
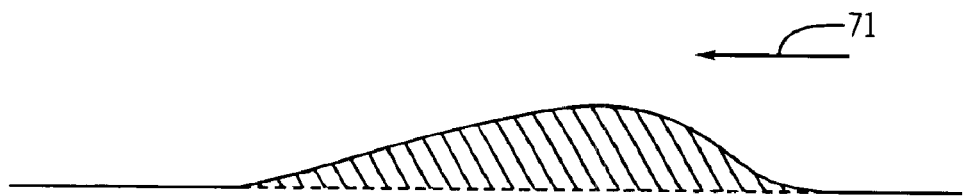
Figure 2C:
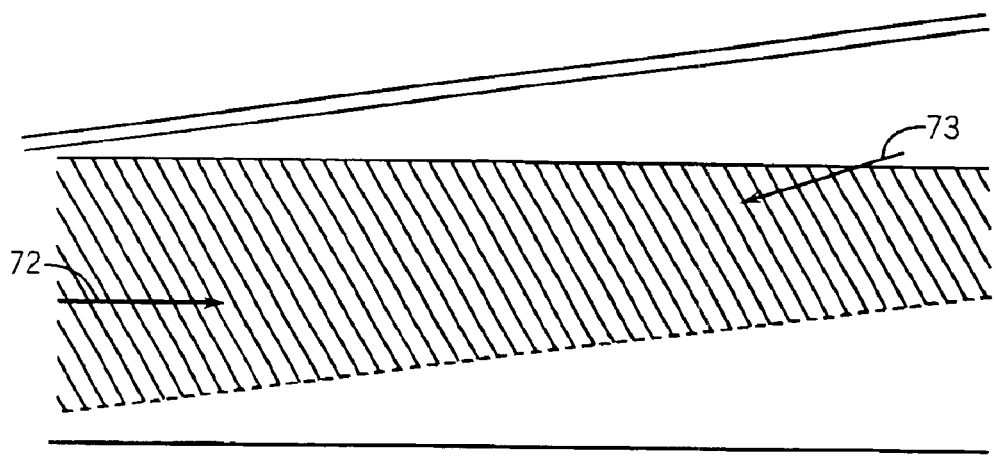

FIG. 2 illustrates an area of a field in which the control system according to the invention may operate. The width of the path over which the product applicator implement 40 passes is shown as lines that are parallel to path vectors 70 to 73. The implement may take path vector 70 around a marsh area in the field. The next path 71 taken can be a straight path as shown. As the implement 40 overlaps an area where product was previously applied, the product dispense points, e.g. sprayer heads 10, located at the overlapping areas can be set to a reduced or zero rate. The actual application will occur in discrete or incremental steps according to the width of area that each dispense unit 10 is configured to cover, as opposed to the smooth path used for illustration. FIG. 5 illustrates more realistically the reduction in duplicate application in increments as dispense points that cover at least part of an area not previously applied to (not shown as hatched) are left on at the set rate. Another path vector 72 may be the last full application path for the field area, after which a path 73 may be take to cover the remaining area and not duplicate product application to the hatched area representing the previously applied area. Likewise, all areas that are less than the full application width of the implement may be treated using a control system according to the present invention to reduce or eliminate duplicate application.

If multiple implements are simultaneously working in a field, it is desirable that each will be able to avoid duplicate application, even to areas where the other implement has applied product. One preferred manner in which this may be done is by having each implement 40 provided with a communicator, such as a radio transceiver 56, with which the implements operating at the same time may get "as applied data" from each other.

In step 63, in the control algorithm depicted in FIG. 3 includes getting "as applied data" from other implements performing the same type of operation in the same field at the same time. If operation of one implement is interrupted, the "as applied data" may be stored on the as applied PCcard 55 for use later or for use by other implements.

Figure 7:
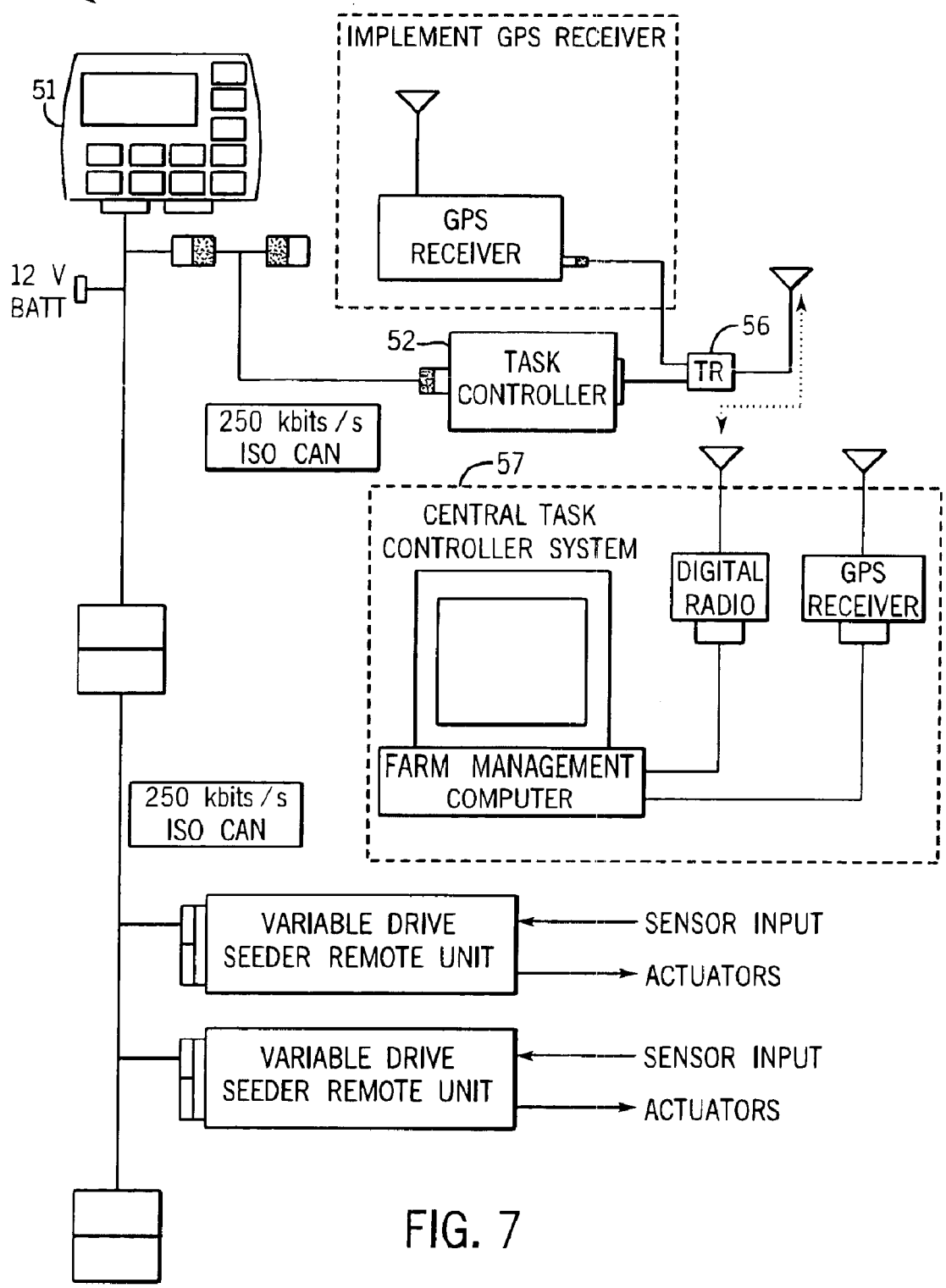
FIG. 7 is a schematic diagram of an alternative control system depicting another embodiment of components that may be typically used for operating the precision farming control system of the present invention.

FIG. 7 shows an alternative embodiment in which more than one implement 40 may be performing like operations at the same time. In FIG. 7, the control system 100 for an implement is illustrated wherein the task controller 52 is associated with a central controller system 57 at a remote location. Such a central task controller system may include the ability to communicate other messages to the implement 40 for display to the implement operator, and be updated in real time. The central task controller 57 would compare the implement's location with the same location in the centrally stored digital map of application rates and transmit the desired application rate back to the implement 40 for that location. The central controller has the current location stored and compares the current location with each location message provided by the GPS receiver. The central controller 57 would transmit this differential position data provided by the central GPS receiver and any required rate changes. The implement 40 would provide this received differential correction data to its' GPS receiver and the receiver would correct its' location message provide to the implement. The implement's remote controller would also transmits its' real time as applied data back to the central controller for recording in the fields as applied database. This information would be used to determine if another implement has traversed a previously applied location. If so the central task controller would communicate to the second implement not to apply any product. Other implement data, such as implement speed, engine rpm, actuator drive signals, temperature and others, could also be communicated back to the central task controller for recording in a database.

After the completion of the application of products to the field by the implements, the central task controller 57 can determine if any part of the field has not traversed from the communicated as applied data. If this occurs, the central task controller can communicate to the operator to proceed to the specific field location to apply the missing products. When the implement traverses the missed location, the required application rate data is communicated to the implement remote controller. As an enhancement of the operator interface console 51, the map of the field can be communicated to each implement indicating which parts of the field has be traversed. This would provide information to the operators of the parts of the field that have not been traversed.

Figure 8:
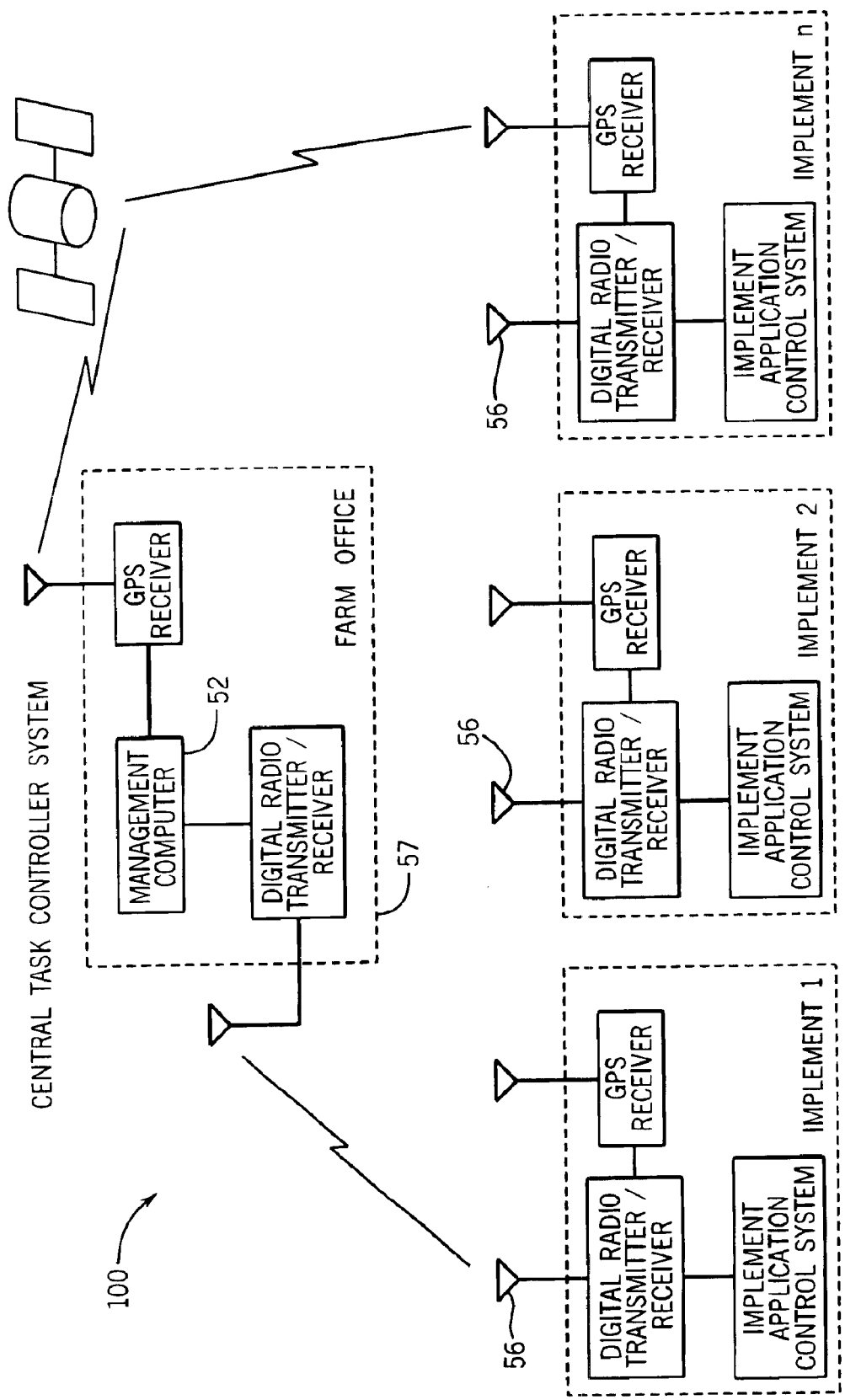
FIG. 8 is a schematic diagram of another alternative embodiment of a control system that may be typically used for operating the precision farming control system of the present invention.

Another alternative embodiment of the control system 100 is shown in FIG. 8 in which multiple implements 40 are in communication with a central control system 57 via each of their radio transceivers 56. The central control system may include a task controller 52 by which each of the multiple implements are controlled, or each implement may be equipped with its own task controller and be able to get updated "as applied data" for the product as applied by the multiple implements in real time, along with other messages.

The invention may not include delay compensation control, or variable rate control in which case it may not include a ground speed sensor, such that the application control will be enhanced by the invention but less precise than with the preferred embodiments. The dispense rates may be set according to user controlled rates and the implement will need to be operated at a proper speed of movement to achieved the desired application rate. Sprayer heads 10 will be controlled on, off, or at an alternate rate, according to the invention.

All the sprayer heads 10 may be controlled by the precision control system, or alternatively only a certain number of sprayer heads inward from the ends of each left and right outer ends of the product application booms 41 and 42, which may be sufficient for controlling prevention of duplicate application.

Alternately in other embodiments such as for airseeder implements, product may be controlled to groups of product dispense points with control provided to vary the rate or allow on/off control of the group of product dispense points. An airseeder, for example, may have sprayer heads connected by branch lines to a common product distribution line. The airseeder may control metering to one or more of these common product distribution lines.

While the embodiments illustrated and described above are presently preferred, one skilled in the art will understand that these embodiments are offered by way of example only, and that the invention disclosed herein may be modified for use on other implements, such that the invention is not intended to be limited to any particular embodiment, but is intended to extend to modifications that fall within the scope of the claims.

Having thus described the invention, what is claimed is:

1. A precision farming system for applying product to a field, said precision farming system comprising:

at least a first agricultural implement and a second agricultural implement; and at least a first control system and a second control system, said first control system associated with said first agricultural implement, and said second control system associated with said second agricultural implement, said first control system communicating with said second control system to obtain information relating to a prior application of said product to portions of said field to prevent duplicative application of said product to said portions of said field where a prior application has occurred.

2. The precision farming system of claim 1 wherein at least one of said first control system and said second control system is operable to control the rate of flow of said product to said field in response to a prescription map requiring variable application of said product to said field.

3. The precision farming system of claim 1, wherein at least said first control system is operable to control a rate at which said product is being dispensed from said first agricultural implement in response to data received by said first control system from said second control system, said data relating to said prior application by said second agricultural implement of said product to said field.

4. The precision farming system of claim 3, wherein said second control system includes a transmitter for transmitting data relating to said prior application of said product to said field by said second agricultural implement, and said first control system includes a receiver for receiving said data transmitted by said second control system.

5. The precision farming system of claim 4 further including a central master control system in communication with said first and second control systems, said central master control system receiving said data transmitted by said second control system and transmitting said data to said first control system.

* * * * *